United States Patent
Smith et al.

[11] Patent Number: 5,887,713
[45] Date of Patent: Mar. 30, 1999

[54] HOLDER FOR COMPACT DISCS

[75] Inventors: Jeffrey M. Smith, Hacienda Heights; Richard F. Smith, Huntington Beach; Steven R. Anderson, Chino Hills; Judie K. Smith, Huntington Beach, all of Calif.

[73] Assignee: Ultrapac, Inc., Santa Fe Springs, Calif.

[21] Appl. No.: 729,534

[22] Filed: Oct. 11, 1996

Related U.S. Application Data

[63] Continuation of Ser. No. 548,558, Oct. 26, 1995, abandoned.

[51] Int. Cl.$^6$ .................................................. B65D 85/57
[52] U.S. Cl. ....................................... 206/308.1; 206/310
[58] Field of Search .................................. 206/303, 307, 206/307.1, 308.1, 310, 311, 493

[56] References Cited

U.S. PATENT DOCUMENTS

| | | | |
|---|---|---|---|
| D. 365,361 | 12/1995 | Smith et al. | D29/26 |
| 4,535,888 | 8/1985 | Nusselder | 206/308.1 |
| 4,793,479 | 12/1988 | Otsuka et al. | 206/308.1 |
| 4,874,085 | 10/1989 | Grobecker et al. | 206/308.1 |
| 4,895,252 | 1/1990 | Nomula et al. | 206/308.1 |
| 5,251,750 | 10/1993 | Gerlardi et al. | 206/493 |
| 5,377,825 | 1/1995 | Sykes et al. | 206/310 |
| 5,383,554 | 1/1995 | Cowan | 206/310 |
| 5,400,902 | 3/1995 | Kaminski | 206/310 |
| 5,417,324 | 5/1995 | Joyce et al. | 206/310 |
| 5,494,156 | 2/1996 | Nies | 206/308.1 |
| 5,515,968 | 5/1996 | Taniyama | 206/310 |
| 5,526,926 | 6/1996 | Deja | 206/308.1 |
| 5,586,651 | 12/1996 | Krummenacher | 206/308.1 |

FOREIGN PATENT DOCUMENTS

| | | |
|---|---|---|
| 3425579 | 1/1986 | Germany . |
| 2291640 | 1/1996 | United Kingdom . |

OTHER PUBLICATIONS

Original Amaray CD Container (undated) (1 Photo).
Recotron CD Container (undated) (2 Photos).
Newer Amaray CD Container (undated) (3 Photos).

*Primary Examiner*—Jim Foster
*Attorney, Agent, or Firm*—Edgar W. Averill, Jr.

[57] ABSTRACT

A holder for removably supporting a compact disc or other object with a hole in the center. The compact disc is supported by at least two arms which are held on a flexible step. The arms have an outwardly extending protrusion which holds the compact disc in place. When it is desired to remove the disc the arms are pressed from above and they hingedly move together and cause the compact disc to pop upwardly from the arms.

13 Claims, 5 Drawing Sheets

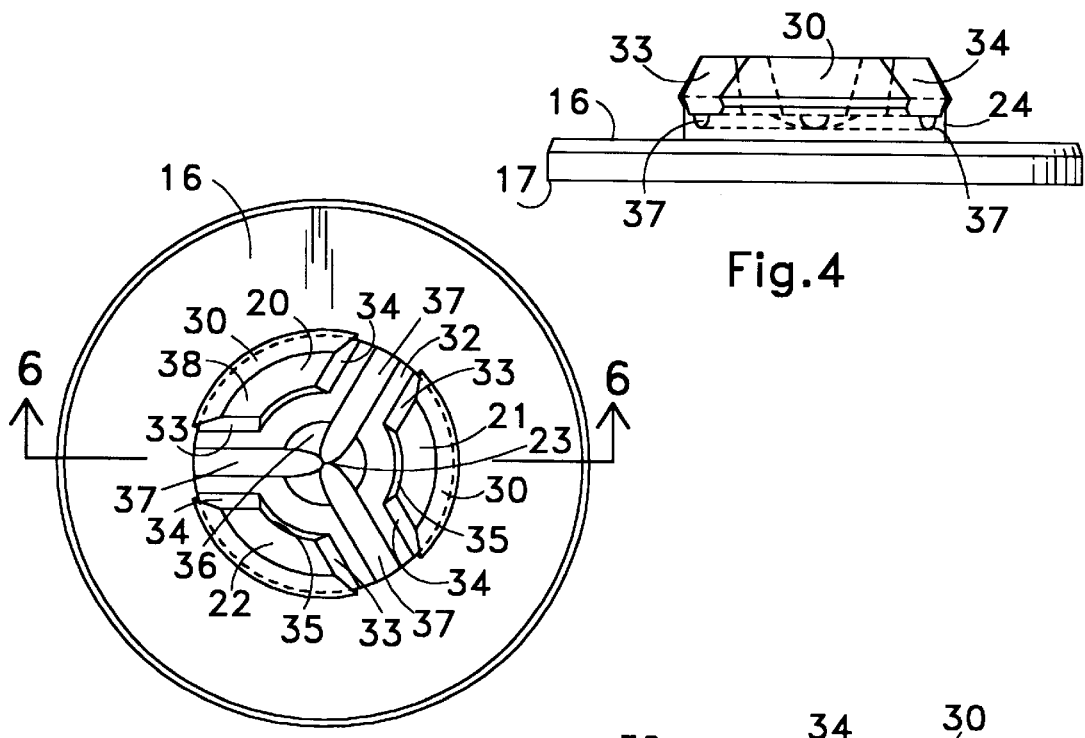
Fig.4
Fig.3
Fig.5
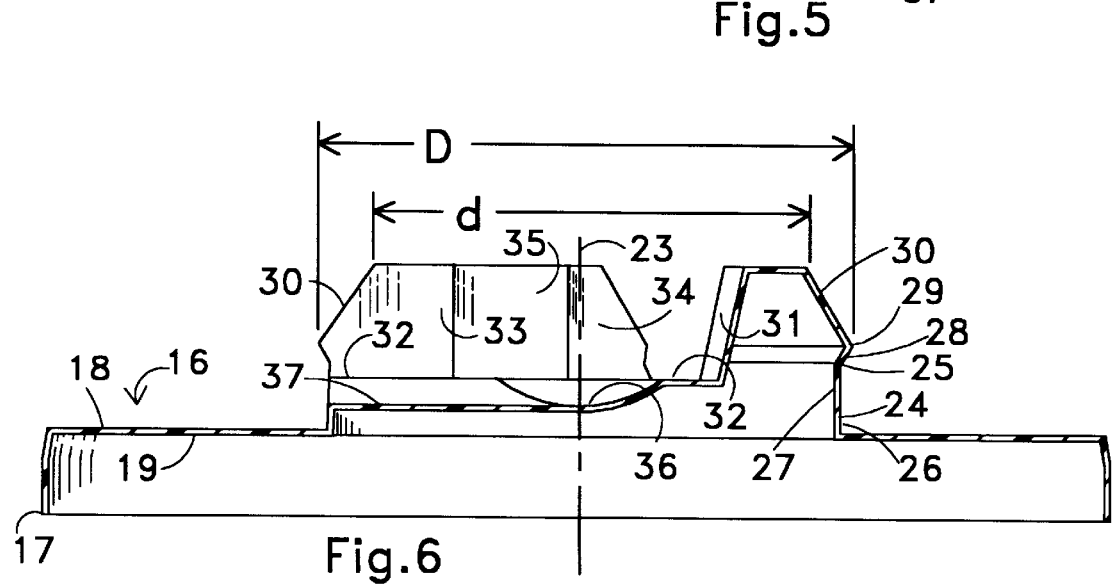
Fig.6

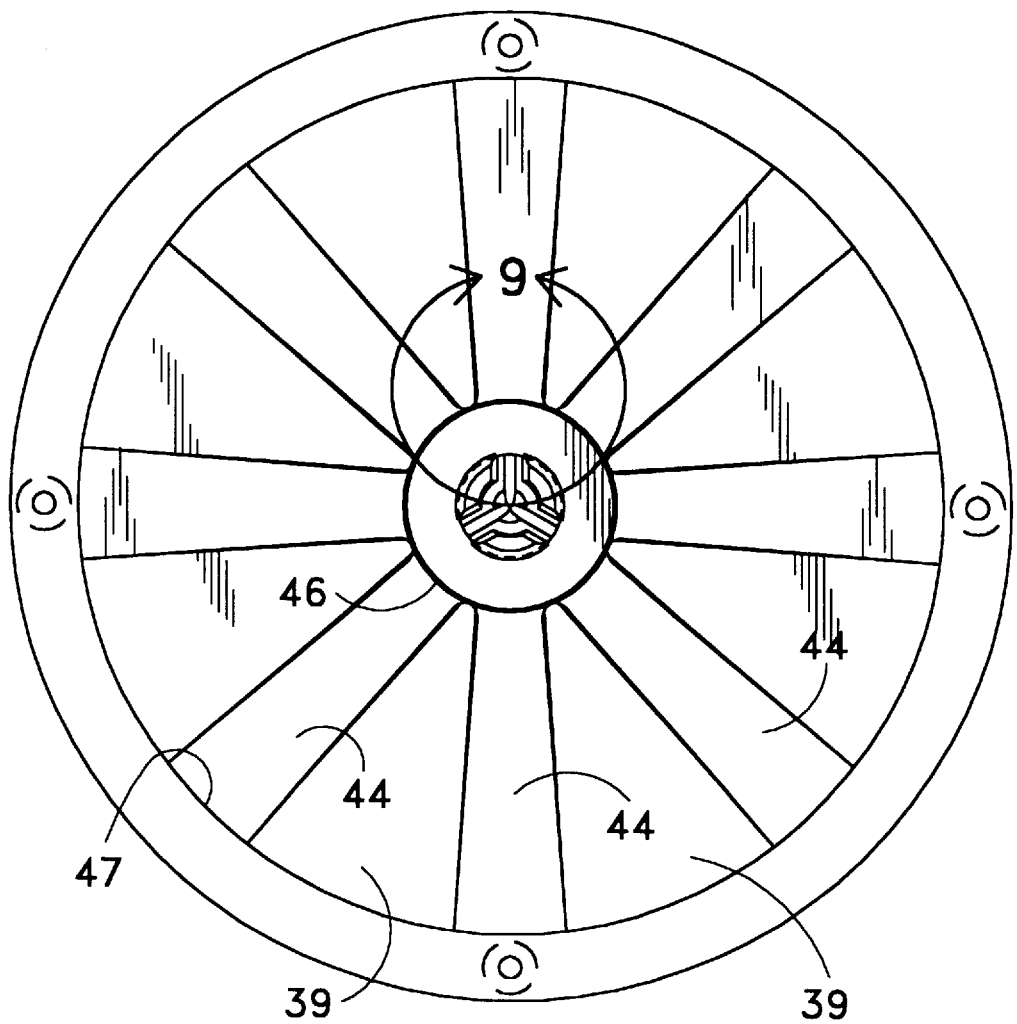
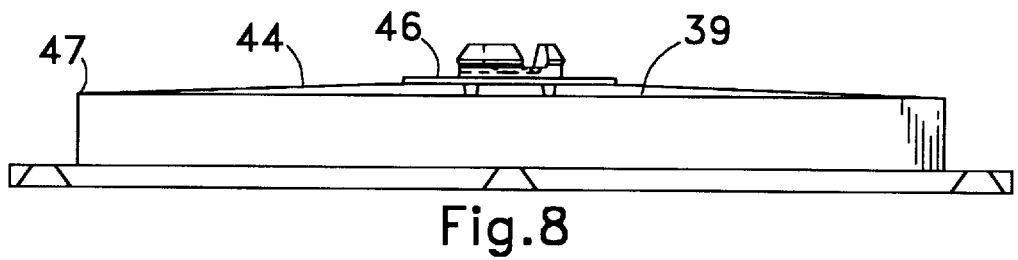

5,887,713

HOLDER FOR COMPACT DISCS

This application is a continuation of application Ser. No. 08/548,558 filed on Oct. 26, 1995, now abandoned.

BACKGROUND OF THE INVENTION

The field of the invention is devices for holding compact discs or other flat typically circular objects with a circular opening. Compact discs or laser discs are increasing in popularity. They have reached a dominant position in the recorded music area and are rapidly growing in the field of computer data and computer program storage and retrieval. The typical compact disc has an outside diameter somewhat over 4½". A currently dominant package for holding compact discs is referred to as a "jewel case". The compact disc is held by a plurality of cantilevered arms and one patent showing such holder is U.S. Pat. No. 4,535,888. Attempts have been made to provide a low cost disc holder and one that permits the user to remove the disc by pressing in the center of the holder. One such approach is shown in U.S. Pat. No. 4,895,252 where a central hub 20 basically in the shape of a flat topped dome may be depressed to facilitate the removal of the disc. The device is designed so that the central hub is supported both from below and from above in a receptacle.

BRIEF SUMMARY OF THE INVENTION

It is an object of the present invention to provide a holder for a compact disc which will securely support the compact disc during shipment and display without the need for any device over the holder and yet which will enable a user to easily remove the compact disc preferably by simply pressing on the top of the center hub of the holder.

The present invention is for a holder for removably supporting a compact disc or other flat object with a central opening. The holder has a compact disc support step which extends outwardly from a support step base. At least two compact disc support arms extend outwardly from the support step and each of the arms are centered about a single support arm central axis. Each of the support arms has an outer ring centered about the central axis. The outer ring extends outwardly from the support step and ends at a compact disc restraining portion which extends away from the outer surface of the outer rim. The restraining portion has an outer edge. A guide ring extends outwardly with respect to the compact disc support step and also extends toward the single support arm central axis and is preferably generally conical in shape. It is centered about the central axis and has a minimum diameter which is less than the opening in the compact disc to be held and a maximum diameter which is greater than the inside diameter of the opening in the compact disc to be held. The guide ring extends over the top and then inwardly to an inner floor so that the support arm is supported not only by the outer rim but also by the inner floor. Each support arm has an end wall at each end which extends inwardly to the inner floor. The inner floor is positioned inwardly with respect to the outer edge of the compact disc restraining portion so that the support arms can flex both inwardly and centrally toward the central axis to permit the compact disc to easily be removed. Preferably the support floor flexes sufficiently so that the compact disc will pop off of the holder when it is pressed in the center. Preferably there are three compact disc support arms. Also preferably there are also a set of grooves, one between each pair of support arms. Further preferably a central dimple is positioned and extends inwardly around the central axis to further control and enhance the flexing action of the support arms.

DESCRIPTION OF THE DRAWINGS

FIG. 3 is a top view of the essential part of the holder of the present invention.

FIG. 4 is a right side view of the holder of FIG. 3.

FIG. 5 is a front view of the holder of FIG. 3.

FIG. 6 is an enlarged cross-sectional view taken along line 6—6 of FIG. 3.

FIG. 7 is plan view of a compact disc holder further including a floor area with support ribs.

FIG. 8 is a front view of the holder of FIG. 7.

DESCRIPTION OF THE PREFERRED EMBODIMENTS

Figure 1:
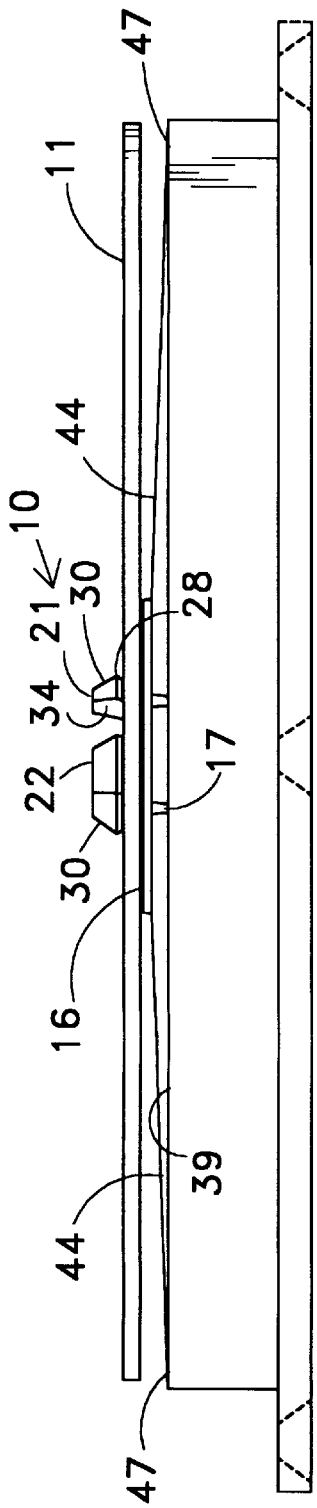
FIG. 1 is a side view of a holder for removably supporting a compact disc of the present invention including a supported compact disc.
Figure 2:
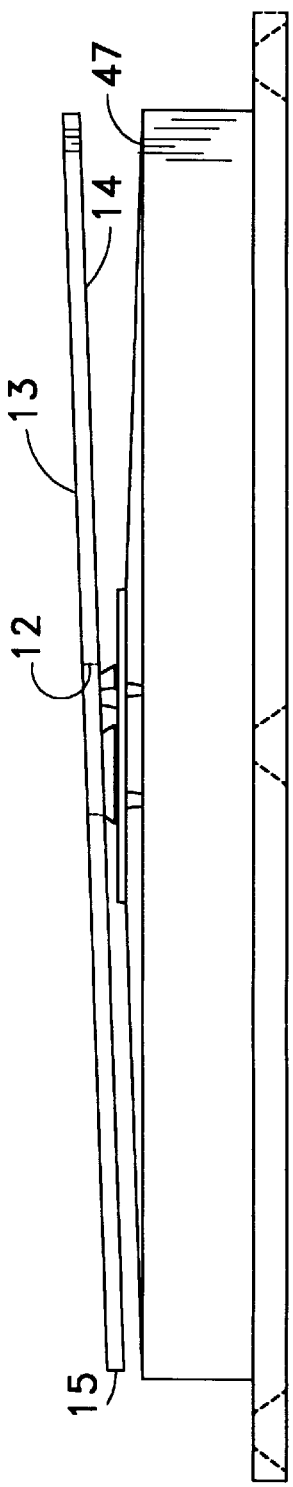
FIG. 2 is a side view analogous to FIG. 1 but showing a compact disc in a partly removed position.

A compact disc holder together with a floor assembly is shown in FIG. 1 with the holder indicated by reference character 10. Holder 10 is supporting a compact disc 11 about its circular center opening 12 which has an inner surface, an upper edge at the intersection of the circular center opening 12, and an upper surface 13. The inner surface of circular center opening 12 has a lower edge at the intersection of the circular center opening 12 and a lower surface 14. Details of the construction of the holder will be discussed in conjunction with FIG. 3, but generally as shown in FIG. 1, the compact disc is held below a compact disc restraining portion 28 and may be easily snapped out onto the holder by placing the circular central opening 12 over guide ring 30 and snapping it in place so that it is suspended above the ribs 44 which extend above the outer floor 39 as discussed below. When one presses on the top of arms 20, 21 and 22, the compact disc pops into the configuration shown in FIG. 2 where it may be readily removed by the user. The arms 20, 21 and 22 are shown in a depressed position in FIG. 2 and when arms 20, 21 and 22 are released, they inherently lift the disc 11.

Figure 12:
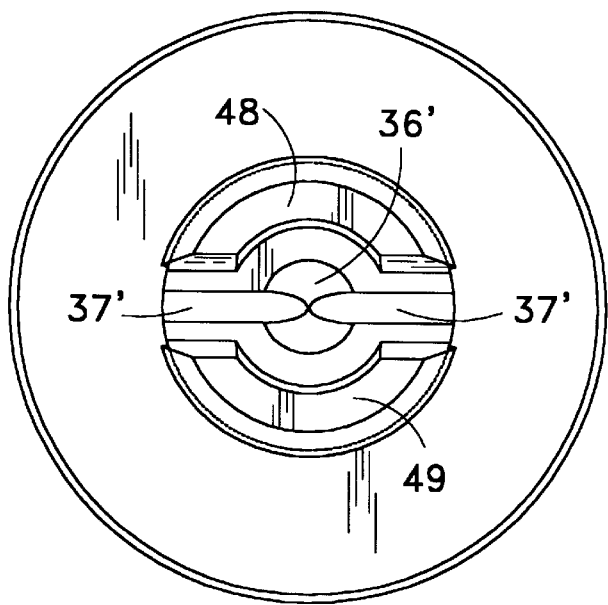
FIG. 12 is a plan view of a compact disc holder with two support arms.

Turning now to the details of the holder construction which permit this secure, yet easily removable, holding, reference is most easily made to FIGS. 3 and 6. The holder has three compact disc support arms 20, 21 and 22 which are held by a compact disc support step 16. While three support arms are shown in most of the drawings, the device may have as few as two support arms as shown in FIG. 12 with an upper limit of about ten depending upon the manufacturing method used. Three arms provide an ideal support, however, and will be described in detail with the understanding that two or more may be used. As shown in FIG. 6, the compact disc support step 16 is held above a support step base ring 17 so that the support arms may be pressed downwardly as viewed in FIG. 6 along a central axis 23. Support step 16 has an upper surface 18 and a lower surface 19 and extends axially to a compact disc support ring which is shown as a generally cylindrical member which contacts the center opening 12 of the compact disc or other object to be held on the device. The compact disc support ring 24 has an inner surface 27 and an outer surface 26. The thickness of the material should be such that the arms 20, 21 and 22 may be flexed inwardly with some ease but rigid enough so that the compact disc will be securely held in place until it is desired to be removed. One material of construction is vacuum formed rigid polyvinyl chloride having a thickness of 0.010 to 0.030 inches.

Compact disc support ring 24 extends upwardly to an upper terminus 25 where it meets compact disc restraining portion 28 which extends away from the central axis at an angle as shown in FIG. 4 to a diameter indicated by reference character "D" which is larger than the inside diameter of the compact disc opening. Restraining portion 28 extends to an outer edge 29 where it angles or curves to compact disc guide ring 30. Guide ring 30 is shown as a frusto conical guide ring although it could as easily be curved to a generally flat outer surface 38 which facilitates the downward pressing on the support arms. Guide ring 30 extends toward central axis 23 and then moves inwardly along inner surface 31 to inner floor 32. The function of inner floor 32 is essential to the operation of the holder of the present invention. Inner floor 32 is shown in the drawings as having a central dimple 36 and three grooves 37 which are beneficial although not essential to the practice of the present invention. They permit the multiple flexing of the device without any tendency to crack after many uses.

Figure 10:
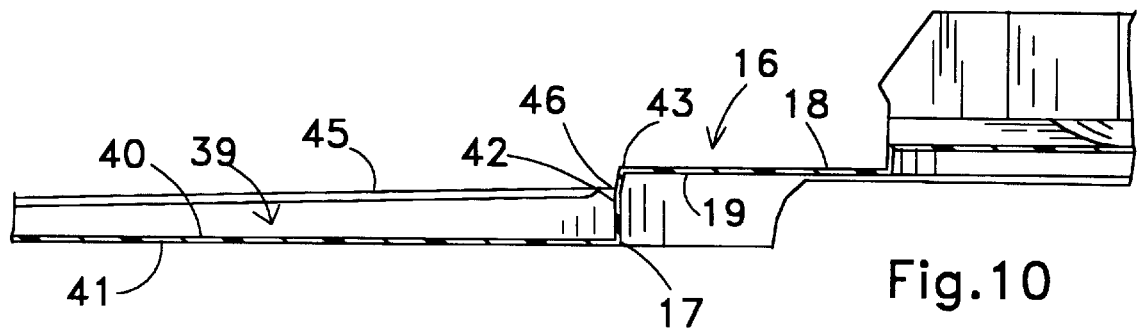
FIG. 10 is an enlarged cross-sectional view taken along line 10—10 of FIG. 9.
Figure 9:
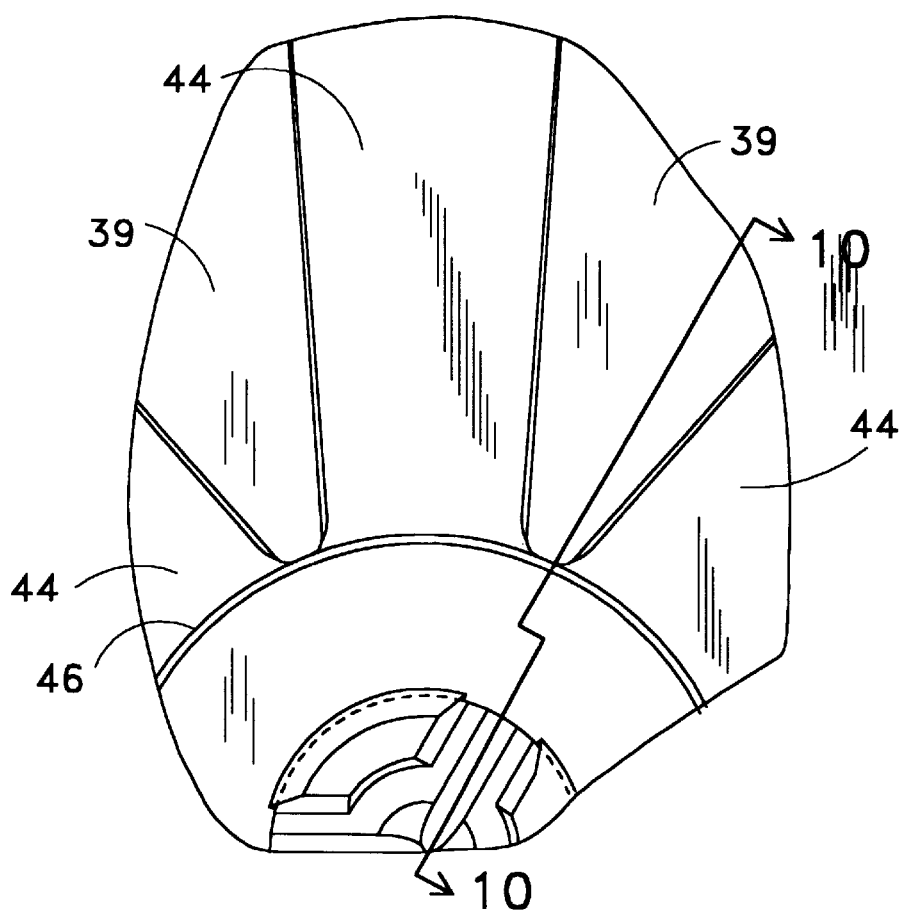
FIG. 9 is an enlarged view taken along line 9—9 of FIG. 7.
Figure 11:
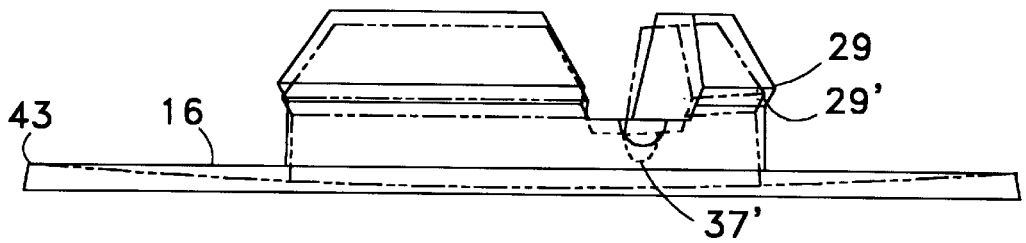
FIG. 11 is a front view analogous to FIG. 5, but showing the flexing action of the compact disc holder of FIG. 3.

Returning to the specific construction of the support arms, each support arm has end walls 33 and 34 which extend downwardly to inner floor 32. Thus, in use, a compact disc having an inside diameter opening greater than diameter "d" and less than diameter "D" is simply pushed over guide ring 30 and snapped in place to a position shown in FIG. 1. The compact disc may simply be removed by lifting along its outer peripheral edge 15 and permitting the support arms to flex inwardly by the pressure of the inside surface of the compact disc against the compact disc restraining portion 28. A more elegant manner of removing a compact disc is indicated best in FIG. 11 of the drawings where pressure placed on the top of the three support arms 20, 21 and 22 moves the support arms inwardly (or downwardly as shown in phantom view in FIG. 11). The downward movement shown in FIG. 11 is only partial and further downward movement is possible as is made clear by viewing FIG. 10. The groove is flexed inwardly as a hinge to the position indicated by reference character 37' in FIG. 11 and causes the outer edge 29 to move toward the central axis to a position indicated by reference character 29'. The outer edge of support floor 16 is indicated by reference character 43 and holds the compact disc from any downward movement as positioned in FIG. 11 causing it to pop off the compact disc restraining portion 28 without any prying up of the compact disc at all. This combination of a hinged action between the individual arms together with the downward movement as reflected in FIG. 11 results in a surprisingly easy removal step. Preferably the compact disc holder of FIG. 3 is molded together with a floor as shown best in FIGS. 7 through 10. As shown best in FIG. 10, support step 16 has an outer edge which is coincident with upper edge 43 of peripheral wall 42 which extends upwardly from support base 17. Outer floor 39 has an upper surface 40 and a lower surface 41 and preferably has a plurality of support ribs 44 which have an upper surface 45. These support ribs as well as the outer floor 39 tend to help support support step 16 and particularly the outer edge thereof so that the removal by pressing down on the top of the support arms is greatly facilitated. As shown best in FIGS. 7 and 8, the ribs are preferably tapered from an inner edge 46 to an outer edge 47 and thus have the combination of supporting the peripheral wall 42 as well as being held away from the lower surface 14 of compact disc 11 as shown best in FIG. 1. The upper surface of compact disc 11 is indicated by reference character 13.

Figure 13:
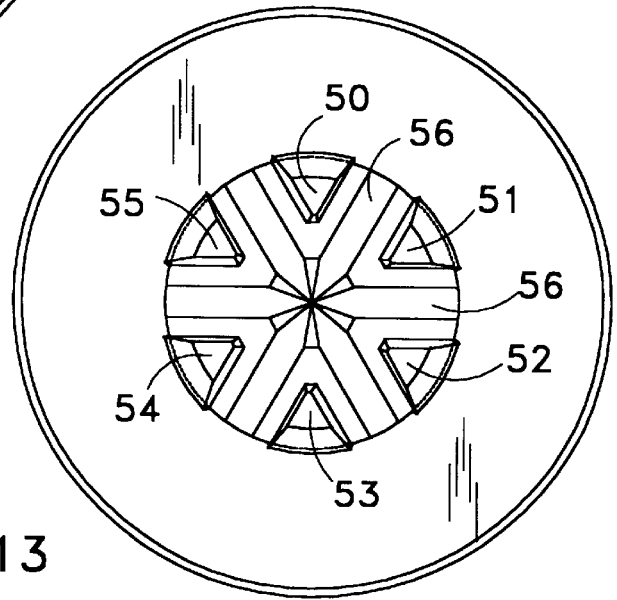
FIG. 13 is a plan view of a compact disc holder having six support arms.

As shown in FIG. 12, the holder may have only two support arms 48 and 49 surrounding a pair of grooves 37' and a central dimple 36'. As shown in FIG. 13 many more than three support arms may be used such as the six support arms indicated by reference characters 50, 51, 52, 53, 54 and 55, each of which has a groove 56 between adjacent arms. These grooves also terminate in a central dimple.

It is contemplated that the holder of the present invention can be used in place of the central member of a conventional jewel case so that the compact disc can easily be removed by simply pressing on the top of the support arms without the unpleasant prying step required by the conventional jewel case cantilevered arms. It is also contemplated that the holder of the present invention can be used in conjunction with a vacuum formed holder of the type shown generally in U.S. patent application Ser. No. 29/016,763 filed Sep. 1, 1995. This facilitates a greatly expanded outer surface for art work and information as compared to the conventional jewel case. It also permits the inclusion of a substantial amount of literature in the cover as well as the aforementioned increased base for artwork.

While the holder of the present invention has been shown as a vacuum formed device, it can, of course, be injection molded or formed by other processes. While radial ribs 44 are shown, for instance in FIG. 7 of the drawing, other reinforcing means such as concentric ribs could be used. While the inner floor is shown as an impervious floor in the drawings, for some designs slits or one or more small holes could be formed in the floor as long as the floor supports and restrains the flexing of the support arms.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A holder (10) for removably supporting a compact disc (11) of the type having a circular center opening (12), an upper surface (13) and a lower surface (14) and an outer peripheral edge (15), said holder (10) comprising:

a compact disc support step (16) extending upwardly from a support step base (17), said support step (16) having an upper surface (18) and a lower surface (19);

at least three compact disc support arms (20, 21, 22) extending upwardly from said compact disc support step (16), said support arms (20, 21, 22) being centered about a single support arm central axis (23), the group of said support arms comprising:

a compact disc support ring (24) centered about said central axis (23), said compact disc support ring extending upwardly with respect to said compact disc support step (16), said compact disc support ring having an upper terminus (25), said compact disc ring having an outer surface (26);

a compact disc restraining portion (28) extending away from the outer surface of said compact disc support ring, said restraining portion (28) having a remote edge (29);

a guide ring (30) extending upwardly from said remote edge (20) and also extending toward said single support arm central axis (23), said guide ring (30) lying along imaginary circles having a minimum diameter (d) and a maximum diameter (D), said imaginary circles centered about said single support arm central axis (23), said guide ring (30) extending toward said single support arm central axis (23) as it extends upwardly from said remote edge (29) of said compact disc restraining portion (28) to an edge closer to said central axis (23) each of said compact disc support arms having a portion which extends downwardly generally in the direction of said compact disc support step (16) and terminating in an inner floor (32) each of said compact disc support arms (20, 21, 22) also terminating in two end walls (33,34) extending centrally from said compact disc supporting ring to an end wall base (35), said inner floor (32) and each of said end wall bases (35) being positioned nearer said single support arm central axis (23) as compared to said outer edge (29) of the compact disc restraining portion (28) so that the compact disc restraining portion (28) can flex both downwardly and hingedly toward the single support arm central axis (23) as the compact disc support arms (20, 21, 22) are pushed downwardly and the downward flex is elastically restrained by the inner floor (32) and by the compact disc support step (16) and said holder (10) is free of any members which move upwardly before the downward movement of the compact disc support arms (20, 21, 22) is stopped.

2. The holder of claim 1 wherein there is a downwardly protruding dimple (36) formed in the inner floor (32) centered about the central axis (23).

3. The holder of claim 1 wherein there is a groove (37) formed in the inner floor (32) extending from the central axis (23) to the compact disc support ring 24.

4. The holder of claim 1 wherein said holder is vacuum formed from rigid polyvinyl.

5. The holder of claim 1 wherein each guide ring (30) is generally frusto-conical in shape and terminate in a generally flat outer surface (38).

6. A holder (10) for removably supporting a compact disc (11) of the type having a circular center opening (12), an upper surface (13) and a lower surface (14) and an outer peripheral edge (15), said holder (10) comprising:

an outer floor (30) having an upper surface (40) and a lower surface (41);

a compact disc support step (16) extending upwardly from said outer floor (39) and supported by a peripheral wall (42) which extends from a support step base (17) to a peripheral wall upper edge (42), said support step (16) having an upper surface (18) and a lower surface (19);

at lease two compact disc support arms (20, 21, 22) extending upwardly from said compact disc support step (16), said support arms (20, 21, 22) being centered about a single support arm axis (23), the group of said support arms comprising:

a compact disc support ring (24) centered about said central axis (23), said compact disc support ring (24) extending upwardly with respect to said compact disc support step (16), said compact disc support ring have an upper terminus (25), said compact disc support ring having an outer surface (26);

a compact disc restraining portion (28) extending away from the outer surface of said outer rim, said restraining portion (28) having an outer edge (29);

a guide ring (30) extending upwardly with respect to said outer edge (29) of said compact disc restraining portion and also extending toward said single support arm central axis (23), said guide ring (30) lying along imaginary circles having a minimum diameter (d) and a maximum diameter (D), said imaginary circles centered about said single support arm central axis (23), said guide ring (30) extending toward said single support arm central axis (23) as it extends upwardly from said outer edge (29) of said compact disc restraining portion (28) to an inner surface (31) each of said compact disc support arms having a surface which extends downwardly facing the central axis (23) generally in the direction of said compact disc support step (16) and terminates in an inner floor (32), each of said compact disc support arms (20, 21, 22) also terminating in two end walls (33, 34) extending downwardly to an end wall base (35), said inner floor (32) and each of said end wall bases (35) being positioned nearer said single support arm central axis (23) as compared to said outer edge (29) of the compact disc restraining portion (28) so that the compact disc restraining portion (28) can flex both downwardly and hingedly toward the single support arm central axis (23) as the compact disc support arms (20, 21, 22) are pushed downwardly and the downward flex is elastically restrained by the inner floor (32) and by the compact disc support step (16) and the compact disc support step flexes downwardly from the upper edge (43) of the peripheral wall (42) and the compact disc is inelastically restrained from downward movement by contact with the upper edge (43) of the peripheral wall (42) and said holder (10) is free of any members which move upwardly before the downward movement of the compact disc support arms (20, 21, 22) is stopped.

7. The holder of claim 6 wherein said outer floor (39) includes a plurality of support ribs (44) extending away from said peripheral wall.

8. The holder of claim 7 wherein said support ribs (44) have an upper surface (45) which tapers from an inner edge (46) near the upper edge (43) of the peripheral wall (42) to an outer edge (47) near the surface (40) of the outer floor (39).

9. The holder of claim 8 wherein there are eight support ribs.

10. A holder (10) for removably supporting a compact disc (11) of the type having a circular center opening (12), an upper surface (13) and a lower surface (14) and an outer peripheral edge (15), said holder (10) comprising:

a base (17);

a compact disc support step (16) extending from the base (17) to displace the disc (11) from the base (17);

at least three compact disc support arms (20, 21, 22) extending from said compact disc support step (16), said support arms (20, 21, 22) being centered about a single support arm central axis (23), each of said at least three support arms comprising;

a compact disc center opening support portion (24) on an outer surface of said support arm, said compact disc center opening support portion displaced from said compact disc support step (16), said compact disc center opening support portion (24) having an upper terminus (25) and an outer surface;

a compact disc restraining portion (28) extending away from the outer surface of said compact disc center opening support portion (24), said restraining portion (28) having a remote edge (29);

a compact disc central opening guide and arm camming portion (30) near an outer terminus of said support arm and adjacent said compact disc restraining portion (28) to cause said arms to move toward said single support arm central axis (23) when a compact disc is pressed over said compact disc central opening guide and arm camming portion (30);

each of said compact disc support arms having a portion which extends downwardly facing and extending toward said single support arm central axis (23) and toward said base (17) and terminating in an inner floor (32), said inner floor (32) being positioned nearer said single support arm central axis (23) as compared to said compact disc restraining portion (28) so that the compact disc restraining portion (28) can flex both toward said base (17) and hingedly toward said single support arm central axis (23) as said at lease three support arms (20, 21, 22) are pushed downwardly and the downward flex is elastically restrained by the inner floor (32) and by the compact disc support step (16) and said holder (10) is free of any members which move upwardly before the downward movement of the compact disc support arms (20, 21, 22) is stopped.

11. A process for removing a compact disc (11) having a central opening with an opening surface from a holder (10), the holder (10) having a center resilient post comprising a plurality of support arms (20, 21, 22) with a top and central opening surface contact means (24) with protrusions (28, 30) thereon above said central opening surface contact means (24) and a compact disc support step (16), below said compact disc adjacent said plurality of support arms, the plurality of support arms (20, 21, 22) projecting away from said compact disc support step (16), said process comprising:

pressing downwardly on the top of the plurality of resilient support arms (20, 21, 22) as the support floor (16) keeps the disc (11) from moving downwardly to cause the plurality of support arms (20, 21, 22) to move downwardly and toward each other sufficiently to cause the disc to pop up above said compact disc support step (16) without the exertion of any upwardly directed movement of any member outside of the center resilient post; and removing the loose compact disk (11) from the center resilient post (20, 21, 22).

12. The process of claim 11 wherein there are three support arms (20,21,22).

13. The process of claim 11 wherein the compact disk (11) is restrained from moving downwardly during said pressing downwardly step by a support member (43) closer to the central opening of the compact disk than to an outer peripheral edge of said compact disk.

* * * * *